Figure 9:
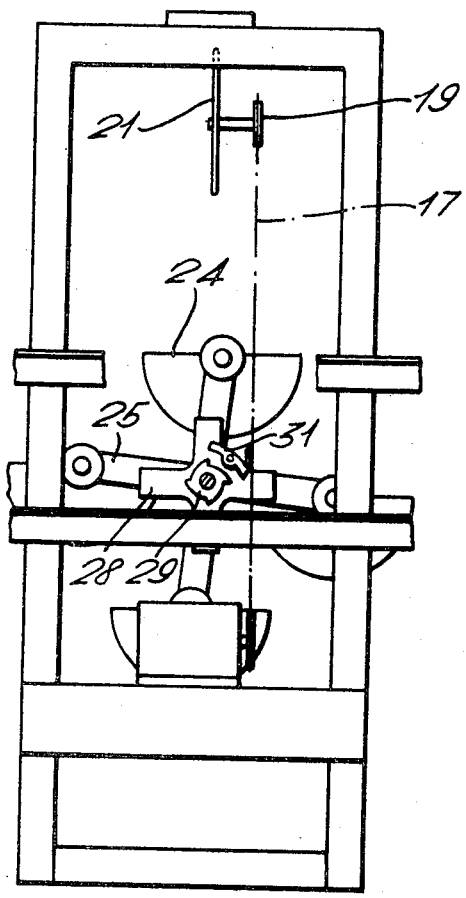

United States Patent [19]
Levinstein

[11] 3,743,092
[45] July 3, 1973

[54] APPARATUS FOR SORTING FLOWERS ACCORDING TO LENGTH

[76] Inventor: Edna Levinstein, 9, Ein Hakoreh St., Rishon-le-Zion, Israel

[22] Filed: Aug. 27, 1971

[21] Appl. No.: 175,473

[52] U.S. Cl. .................................... 209/74, 209/82
[51] Int. Cl. ............................................... B07c 1/14
[58] Field of Search .............. 209/82, 90, 73, 111.7, 209/74; 198/152

[56] References Cited
UNITED STATES PATENTS

| | | | |
|---|---|---|---|
| 3,659,709 | 5/1972 | Bartlett et al. | 209/82 |
| 3,645,394 | 2/1972 | Goodale | 209/82 |
| 3,401,796 | 9/1968 | Hagiz | 209/82 X |

Primary Examiner—Richard A. Schacher
Assistant Examiner—Gene A. Church
Attorney—William D. Hall, George Vande Sande et al.

[57] ABSTRACT

A flower grader comprising an elongated framework, a conveyor chain movable near either side thereof and flower-receiving trays constituted by a plurality of spaced flat fingers bent angularly and fixed with their one ends to a bar. The trays are pivotally mounted and tiltable between said conveyor chains said tilting being actuated by photoelectric cells. The open ends of said fingers face the front of the grader and said photoelectric cells extend longitudinally between two adjacent fingers near their mounting. For each flower size there are provided at least three collecting troughs mounted between equi-angularly spaced arms of a support fixed to a shaft. The shaft is rotatably supported between the sides of said framework below each predetermined tilting position and is adapted to be rotated by means actuated by said photo-electric cells after a predetermined quantity of flowers has dropped into the trough located uppermost, so that another trough moves into position to collect the sized flowers. The predetermined quantity of flowers is removed at the side of the framework in a bunch into which the flowers have been assembled. A drawer within each trough aids in forming the bunch of the predetermined number of sized flowers.

7 Claims, 12 Drawing Figures

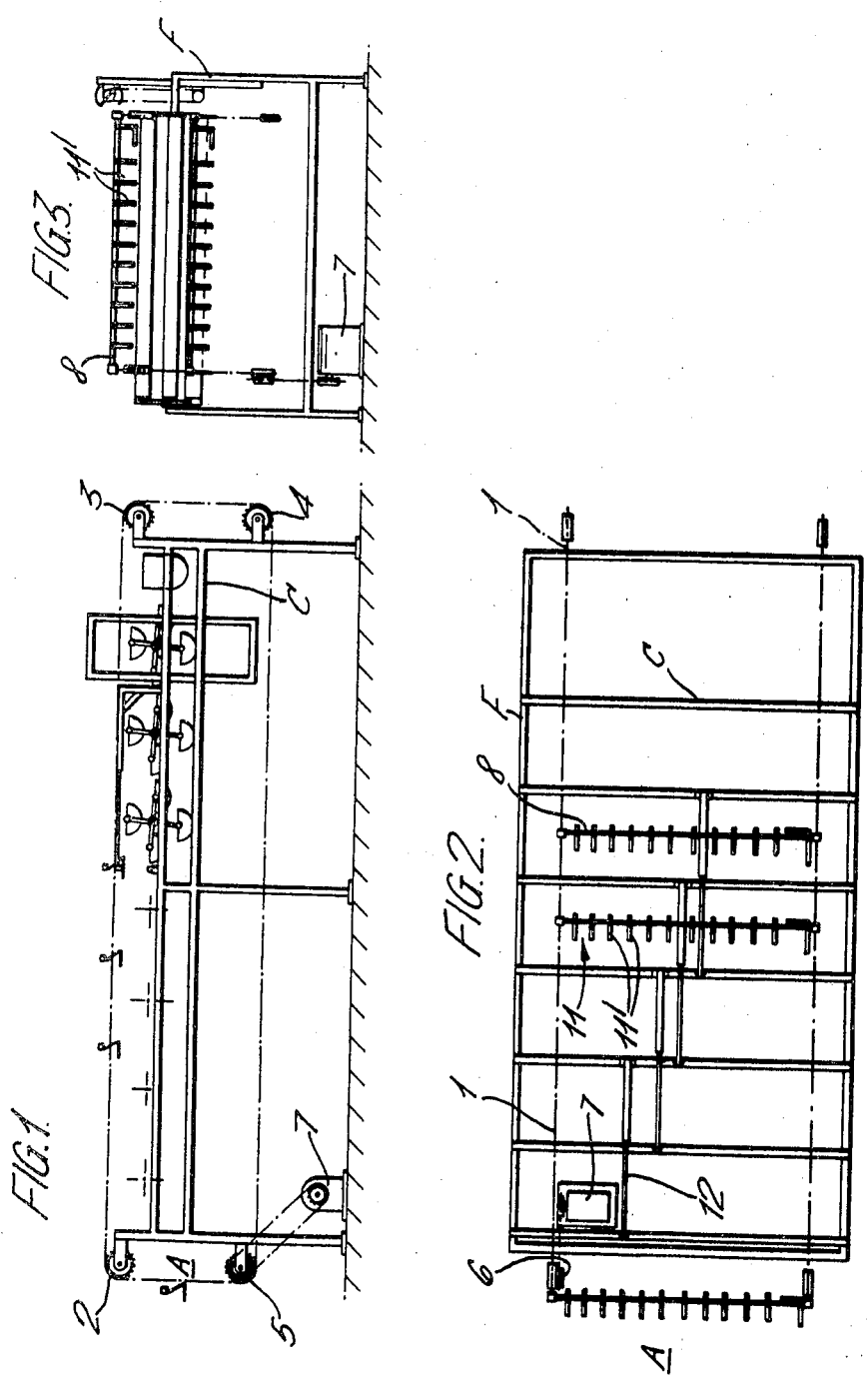

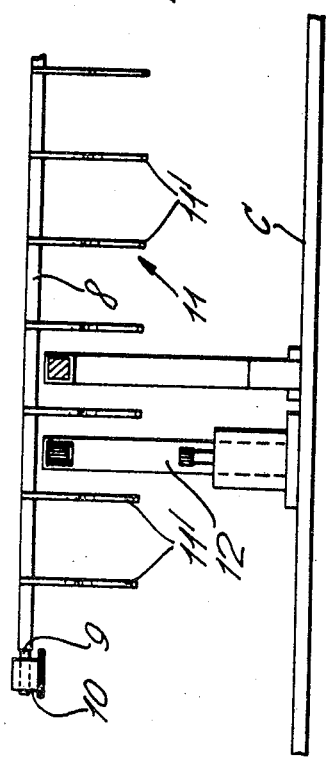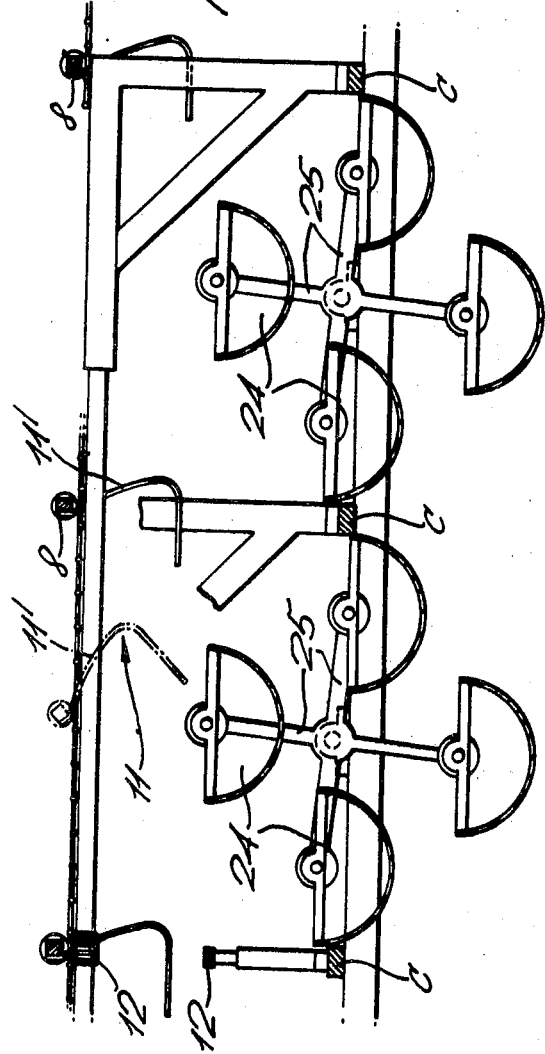

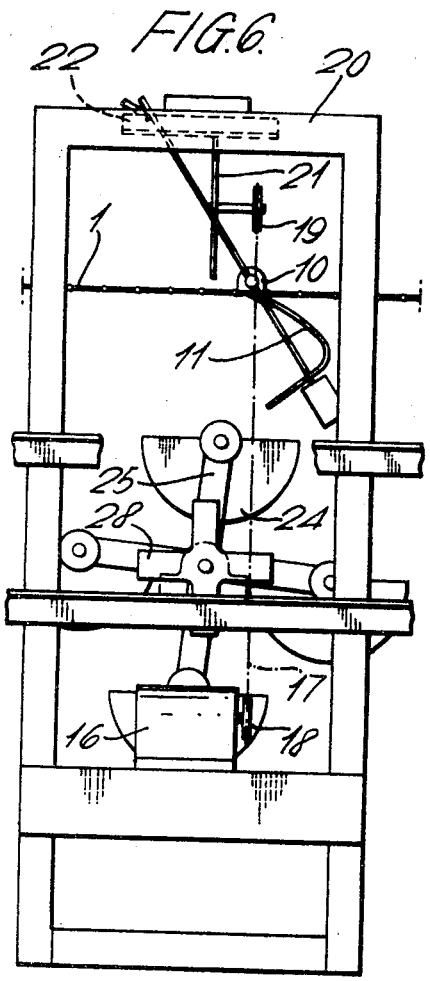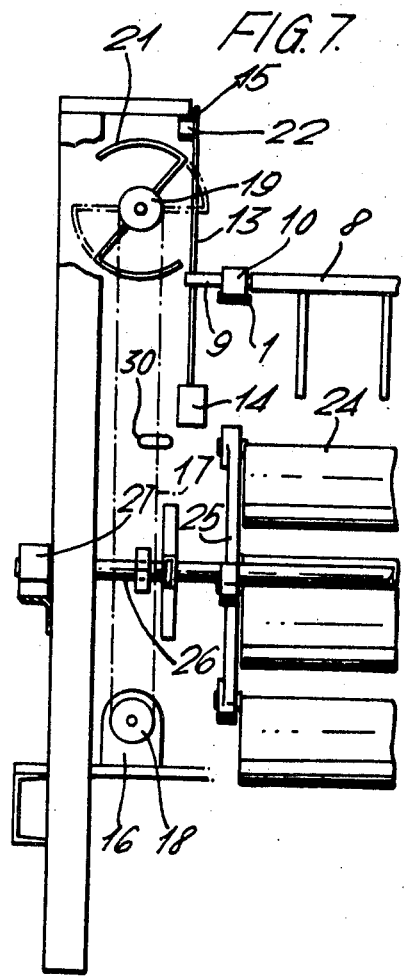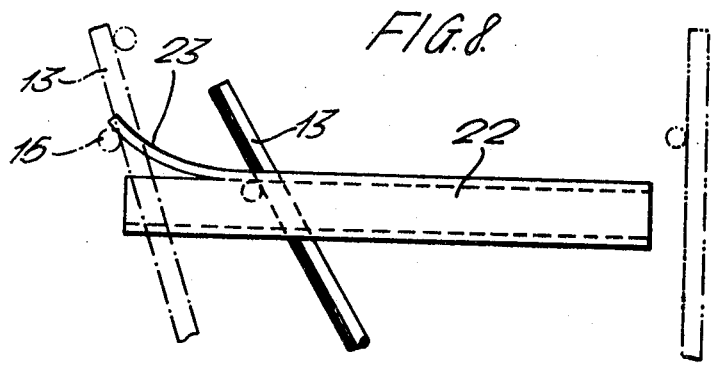

APPARATUS FOR SORTING FLOWERS ACCORDING TO LENGTH

The present invention concerns flower graders for, e.g., roses, gladioli and other flowers of this kind.

There is known a flower grader which comprises two conveyor chains between which rows of trays are attached, one flower being placed into each tray so that all stems extend to one side. The trays are provided with slots at their bottom, the distance between the slots being in accordance with the standard sizes of lengths into which the flowers have to be graded. Photo-electric cells are provided which, when light is received through one of the slots, i.e., the first one not covered by the flower in question, will cause an electromagnet to tip the tray above a bin destined to collect the particular size of flower, which will fall into said bin.

This known grading machine has several drawbacks. Owing to the fact that the trays are closed at the bottom and have only a number of slots, it is easily possible that a leaf or the like may cover a slot in the tray which will influence the operation of the photoelectric cell so that unsatisfactory grading results. Furthermore, the graded flowers collected in each bin must be removed from the side and then must be counted in order to be bundled according to the required quantity in each bundle. This necessitates a number of extra workers for the counting of the flowers.

It is the object of the present invention to provide a grading machine in which the grading is not influenced by extraneous leaves or the like and which therefore results in a more accurate grading.

It is a further object of the invention to provide a means on the grader according to the invention wherein a certain predetermined number of flowers is collected in collecting means thus eliminating the need for counting the flowers. This will result in a great saving of labor.

The invention consists in a flower grader comprising an elongated framework, a conveyor chain movable near either side thereof and flower-receiving trays pivotally mounted and tiltable between said conveyor chains, said tilting being actuated by photoelectric cells, the flower receiving trays being constituted by a plurality of spaced flat fingers bent angularly and fixed with their one ends to a bar pivotally mounted between said conveyor chains, the open ends of said fingers facing the front of the grader.

The invention further consists in a flower grader comprising an elongated framework, a conveyor chain movable near either side thereof and flower receiving trays of any construction pivotally mounted and tiltable at a predetermined position along the grader between said conveyor chains, said tilting being actuated by photo-electric cells, each flower size having at least three collecting troughs mounted between equiangularly spaced arms of a support fixed to a shaft, said shaft being rotably supported between the sides of said framework below each predetermined tilting position and being adapted to be rotated by means actuated by said photo-electric cells after a predetermined quantity of flowers has dropped into the trough located uppermost.

Figure 10:
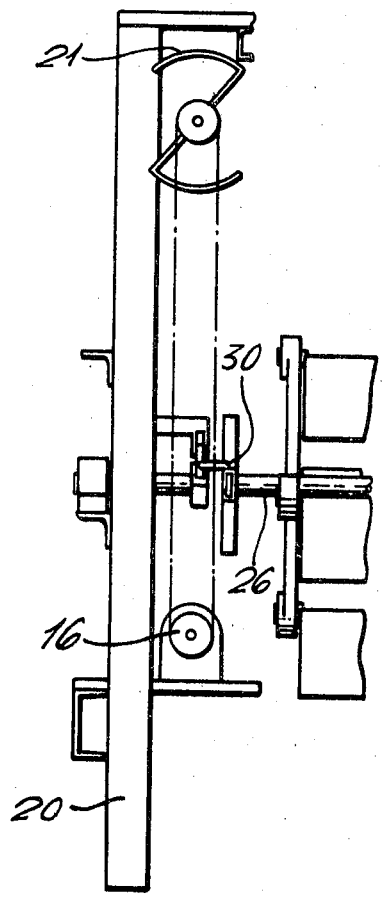
Figure 11:
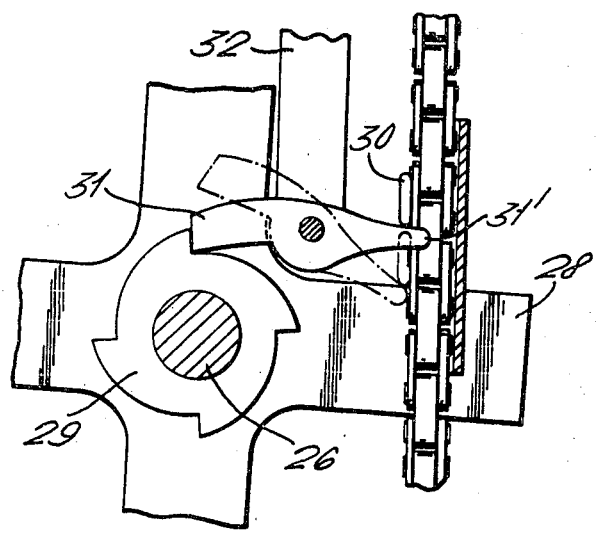
Figure 12:
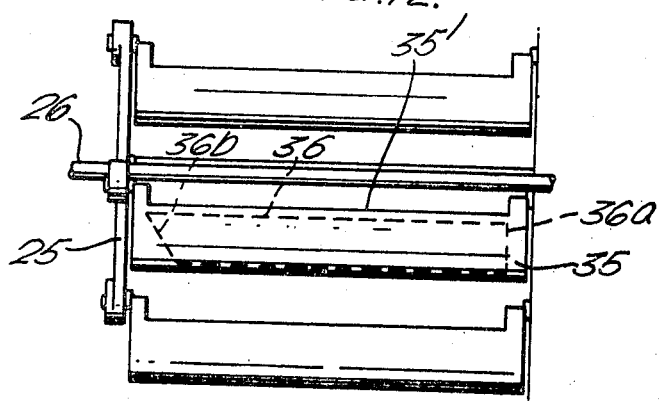

The invention is illustrated by way of example only, in the accompanying drawings in which:

FIG. 1 is a schematic side elevation of a flower grader according to the invention;
FIG. 2 is a plan view thereof;
FIG. 3 is a front view thereof;
FIG. 4 shows a detail on an enlarged scale;
FIG. 5 shows on an enlarged scale a number of collecting troughs;
FIG. 6 is a side elevation of the tray-tipping mechanism;
FIG. 7 is a partial end view thereof;
FIG. 8 shows a detail on an enlarged scale;
FIG. 9 is a side elevation of the trough-rotating mechanism;
FIG. 10 is a partial end view thereof;
FIG. 11 shows a detail thereof on an enlarged scale.
FIG. 12 shows a side elevation of a second embodiment of a flower collecting trough with a removable drawer.

Referring to FIGS. 1 – 3, the flower grader, according to the invention, comprises a framework F having cross-braces C. Two endless conveyor chains 1 are guided over pulleys 2, 3, 4, 5 near either side of framework F and receive their movement by means of a chain 6, cooperating with pulley 5 and driven by a motor 7. Between chains 1 a plurality of square bars 8 are pivotally mounted by a short shaft 9 which extends axially therefrom and is adapted to pivot in a shackle 10, fixed to the conveyor chain 1 (FIGS. 4, 7). The flower receiving tray 11, according to the invention, is constituted by a plurality of spaced flat fingers 11' (FIG. 5) bent angularly and fixed with their top ends to bar 8, their open ends facing the front A of the machine, i.e., that part of the machine where the flowers to be graded are fed one by one into the trays 11. Because of the spaced fingers 11', there is no possibility of leaves being caught on the trays 11.

A number of photo-electric cells 12, their number depending on the number of sizes of flowers to be graded, are mounted to the transversely extending cross braces C, one photo-electric cell per cross brace. Owing to the particular construction of trays 11, the cells 12 can extend longitudinally between the space of two adjacent fingers 11' (FIG. 4) near their mounting on bars 8, so that a space below the cell is left to permit a flower disposed in trays 11 to pass, i.e., to break the photo-beam, without being damaged. As can be seen clearly from FIGS. 1–5, the photo-electric cells are supported on cross braces C by means of cantilever braces extending from behind the grading stations forward towards the stations in the direction to the front A of the machine. The photo-electric cell 12 destined to grade the largest size of flower being mounted farthest from the right hand side of the machine when seen from the front A, the other cells being mounted progressively closer to said right hand side.

The trays 11 may be tilted with the means of the known graders. However, according to the present invention, novel tilting means are provided. To shaft 9 of bars 8 a rod 13 is fixed (FIG. 7) which at its bottom is provided with a balance weight 14 and at its top with a small lug 15 extending at right angles thereto. The rods 13 and weights 14 assure that during normal travel of the chains 1 around the framework F, the trays 11 assume their correct position, i.e., that in which they are adapted to receive and hold a flower.

When a photo-electric cell 12 is actuated, i.e., when a tray passes which contains a flower shorter than the distance from the right hand side of the machine at which said photo-electric cell is mounted, so that said cell is actuated, the latter causes a motor 16, mounted at the right hand side of the machine to rotate one quarter turn (FIG. 7). This motor in turn rotates a vertically extending chain 17 mounted between a pulley 18 on the shaft of the motor and a pulley 19, fixed in a frame 20 (FIG. 6), one frame 20 being provided for each size of flower to be graded. On the shaft of pulley 19 a cam 21, constituted by a wire bent substantially into Z-shape, is mounted. This cam 21 will thus be located in the path of rod 13 and will force the latter to be tilted whereby tray 11 will also be tilted. In order to assure that the tilting extends for a certain distance, i.e., to give the flower time to drop downwards, a small channel 22 having a short upwardly curved flange 23 (FIG. 8) at its forward end, i.e., that facing the front A of the machine, is provided in frame 20, the lug 15 of rod 13 being engaged by the curved flange 23 and being forced to travel along channel 22 for a short distance. When lug 15 is released, weight 14 will again cause rod 13 to extend vertically whereby tray 11 will assume its normal position.

The flower from tilted tray 11 will drop into a small semi-cylindrical collecting trough 24 (FIGS. 5, 6, 7) located vertically below it. According to the invention four troughs 24 are provided for each flower size, a trough being fixedly mounted at each end of a cross-shaped support 25, the open ends of the troughs always extending upwards. The support 25 is fixedly mounted at its center on a shaft 26 turnable in bearings 27, fixed to framework F.

According to the invention means for regulating the number of flowers to be dropped into each tray 24 are provided. These means comprise a cross-shaped member 28 (FIGS. 6, 9, 11), keyed to shaft 26 and a ratchet 29 likewise keyed to shaft 26 at a slight space from member 28 so that chain 17 can pass between them, a lug 30 (FIG. 11) fixed to the descending stretch of chain 17 and extending slightly therefrom at either side and a spring-loaded pawl 31 pivotally mounted to a bar 32 fixed to frame 20 and adapted to engage ratchet 29 and to hold it. The location of lug 30 on chain 17 is chosen so that after a predetermined number of one-fourth turns of motor 16, i.e., a number which represents the number of flowers of the particular size which have been dropped by a tilted tray 11 into the uppermost trough 25, lug 30 which descends with the moving chain 17 will first engage the nose 31' of pawl 31, whereby the latter will release ratchet 29 and as lug 30 descends further, against the action of its spring, it will impart a push on cross-member 28, thereby turning shaft 26 one-fourth turn (FIG. 11). Said spring (not shown) will return pawl 31 into its normal position to engage ratchet 29, thereby preventing shaft 26 to turn more than one-fourth turn. This one-fourth turn of shaft 26 will, as can be seen from FIG. 9, cause a new collecting trough 24 to be disposed into flower receiving position.

The graded flowers are removed from the troughs 24 at the side of framework F. Since for each flower size four troughs are provided, the speed at which the graded flowers have to be removed, is not great so that one worker can easily handle the removal of all the graded flowers in their pre-counted quantities. This, as can be seen, results in great saving of labor.

While one type of construction of the collecting troughs and their actuation has been above described, there are many variations possible within the scope of the present invention. The shape of collecting troughs 24 may be other than semicylindrical and three or more than four may be provided, in which case ratchet 29, support 25, member 28 must be changed accordingly. If desired, means other than a ratchet and pawl, and member 28 may be provided to cause the turning of shaft 26. Furthermore, more than one lug 30 may be provided at predetermined spacings on chain 17 to provide for the collection of different quantities of flowers in troughs 24.

In the embodiment of the collecting troughs shown in FIG. 12, the walls of the trough 35 have a cut-away portion 35' at their upper longitudinal edges, the portion 35' extending along substantially the entire length of trough 35 from behind its suspension on support 25. Within trough 35 a removable drawer 36 is provided. This drawer has side walls which lie against the side walls of trough 35, a straight end wall 36a adjacent the remote end wall of the trough and an outwardly slanted end wall 36b at the side of the troughs 35 which lies adjacent the flower-removing position.

In the embodiment of a machine using the troughs 35 and drawers 36 as shown in FIG. 12, the trough suspending mechanism shown in FIGS. 5 - 11 will be so mounted, that the fingers 11' will just clear the sides of troughs 35 as a flower is deposited within drawer 36, the bottom of the fingers imparting a gentle push to the flowers to aid in their straight arrangement within the troughs. When one trough has reached the bottom position with the correct number of flowers, the drawer 36 is withdrawn outwards. During this withdrawal, the wall 36a of the drawer assures that the flowers remain in position.

I claim:

1. In a flower grader for grading flowers according to their length and being of the type which includes an elongated framework, a conveyor chain movable near either side thereof and a plurality of flower-receiving trays spaced along said framework and each being pivotally mounted and tiltable between said conveyor chains, the improvement comprising:

each said receiving tray comprising a plurality of angularly bent fingers spaced transversely between said chains and with each said finger having its upper end pivotally supported, each of said bent fingers having its flower-receiving open side facing the front of the machine where the flowers are placed in said trays, a plurality of flower length grading stations longitudinally spaced along said frame and each responsive to the passage of a flower in a respective one of said trays having a length falling within a predetermined range of flower lengths; each said grading station including a photo-electric cell means supported between two adjacent fingers so as to leave a space between a flower carried by the fingers comprising a tray and said photo-electric cell means.

2. A flower grader as claimed in claim 1 wherein each said finger is connected to a bar provided with axially extending shafts pivotally mounted in shackles fixed to said conveyor chains, a rod being fixed to said shaft and being provided with a balance weight at its bottom to maintain each said finger normally in a position to support and convey a flower.

3. A flower grader as claimed in claim 1, wherein a motor is provided for each flower size to be graded, said motor driving a vertically extending chain over a pulley on whose shaft a rotatable cam is mounted, said photo-electric cell being adapted upon actuation by a flower in a respective tray to rotate said motor through a predetermined amount of rotation, whereby said cam extends momentarily into the path of said rod causing the latter to be deviated to tilt said tray.

4. In a flower grader for grading flowers according to their length and being of the type which includes an elongated framework, a conveyor chain movable near either side thereof and a plurality of flower-receiving trays spaced along said framework and each being pivotally mounted and tiltable between said conveyor chains, the improvement comprising:

a plurality of flower-receiving stations longitudinally spaced along said frame each including means for tilting a tray selectively in dependence upon the length of a flower supported therein, a plurality of flower collecting troughs at each said station for receiving from said trays flowers of a predetermined range of lengths, said troughs being supported on the equi-angularly spaced arms of a support member mounted for rotation on a shaft attached to said framework, said shaft supporting said troughs below said trays, and means responsive to the number of flowers dropped from said trays into a trough for rotating said shaft so as to move another trough into position to receive flowers from said trays.

5. A flower grader as claimed in claim 4, wherein a motor driving a vertically extending chain is provided at each grading station, said motor being actuated by means responsive to the presence of a flower in a tray to rotate said chain a predetermined distance, a lug fixed to said chain for engaging a member keyed to said shaft, said member having a number of arms corresponding to those of said support, the engagement of said lug causing said member to rotate said shaft through a predetermined angular distance corresponding to the spacing of said arms.

6. A flower grader as claimed in claim 5, wherein a ratchet is keyed to said shaft, a spring-loaded pawl mounted to said framework locking said ratchet and being adapted to release it when engaged by said lug.

7. A flower grader as claimed in claim 4, wherein four troughs are provided, the support being cross-shaped.

* * * * *

PO-1050
(5/69)

UNITED STATES PATENT OFFICE
CERTIFICATE OF CORRECTION

Patent No. 3,743,092          Dated July 3, 1973

Inventor(s) EDNA LEVINSTEIN

It is certified that error appears in the above-identified patent and that said Letters Patent are hereby corrected as shown below:

Foreign Application Priority Data

August 28, 1970 Israel. . . . . . . . . . . . . 35189

Signed and sealed this 19th day of March 1974.

(SEAL)
Attest:

EDWARD M. FLETCHER, JR.        C. MARSHALL DANN
Attesting Officer               Commissioner of Patents